United States Patent
Leitner et al.

(10) Patent No.: US 10,981,274 B2
(45) Date of Patent: Apr. 20, 2021

(54) AUTOMATIC TRAJECTORY GENERATION FOR CONTROLLING A DRIVE SYSTEM

(71) Applicant: Festo AG & Co. KG, Esslingen (DE)

(72) Inventors: Colin Leitner, Wendlingen am Neckar (DE); Ralph Unden, Ostfildern (DE); Ognjen Drazic, Goeppingen (DE)

(73) Assignee: Festo AG & Co. KG, Esslingen (DE)

( * ) Notice: Subject to any disclaimer, the term of this patent is extended or adjusted under 35 U.S.C. 154(b) by 498 days.

(21) Appl. No.: 15/892,759

(22) Filed: Feb. 9, 2018

(65) Prior Publication Data
US 2018/0229368 A1  Aug. 16, 2018

(30) Foreign Application Priority Data
Feb. 13, 2017  (DE) ............... 10 2017 102 749.1

(51) Int. Cl.
*B25J 9/16* (2006.01)

(52) U.S. Cl.
CPC ........... *B25J 9/1664* (2013.01); *B25J 9/1602* (2013.01); *G05B 2219/13144* (2013.01); *G05B 2219/43168* (2013.01); *Y10S 901/02* (2013.01)

(58) Field of Classification Search
CPC ............. B25J 9/1664; B25J 9/1602; G05B 2219/43168; G05B 2219/13144; Y10S 901/02
See application file for complete search history.

(56) References Cited

U.S. PATENT DOCUMENTS

| 8,294,405 B2 | 10/2012 | Hoffmann et al. |
| 9,981,381 B1* | 5/2018 | Nagarajan ............ B25J 9/1664 |
| 2019/0184560 A1* | 6/2019 | Liu ................. B25J 9/1605 |

FOREIGN PATENT DOCUMENTS

| DE | 102004059966 B3 | 6/2006 |
| DE | 102008029657 A1 | 12/2009 |
| DE | 102014103370 A1 | 9/2015 |
| EP | 2307935 B1 | 4/2011 |
| EP | 2623271 B1 * | 6/2014 ........... G05B 19/404 |

OTHER PUBLICATIONS 20190184560-13 translation (Year: 2014).*
German standard DIN 44 300 entitled "Begriffe—Definitionen und Erklärungen (Terms—Definitions and Explanations)," by R. Dierstein, discussed in paragraph [0042] of this application, Germany, Jan. 2003.

(Continued)

*Primary Examiner* — Abby Y Lin
*Assistant Examiner* — Renee LaRose
(74) *Attorney, Agent, or Firm* — Falk Ewers; Ewers IP Law PLLC (57) ABSTRACT

A method and a trajectory generator are provided which automatically generate a trajectory, which is converted into control signals (sd) for the purpose of controlling a drive system. The control signals (sd) are used to control actuators of the drive system to carry out the movement according to the calculated trajectory. The method is implemented on a microcontroller (μC) and has a very short runtime and a low memory requirement.

18 Claims, 3 Drawing Sheets

(56) References Cited

OTHER PUBLICATIONS

Office action (and English-language translation thereof) by the German Patent and Trademark Office issued in DE 10 2017 102 749.1, to which this application claims priority, dated Nov. 20, 2017.
Macfarlane et al. "Jerk-Bounded Manipulator Trajectory Planning: Design for Real-Time Applications," IEEE Transactions on Robotics and Automation, 19(1), pp. 42 to 52, Feb. 2003.
German standard DIN 44 300 entitled "Begriffe—Definitionen und Erklärungen (Terms—Definitions and Explanations)," by R. Dierstein, discussed in paragraph [0042] of this application, Germany, Jan. 2003 and English language machine translation thereof.

* cited by examiner

AUTOMATIC TRAJECTORY GENERATION FOR CONTROLLING A DRIVE SYSTEM

CROSS-REFERENCE TO RELATED APPLICATION

This application claims priority to German patent application 10 2017 102 749.1, filed Feb. 13, 2017, the entire content of which is incorporated herein by reference.

TECHNICAL FIELD

The disclosure relates to an automatic and computer-aided calculation of a trajectory for a drive system, as is used in various technical installations, for example in automation systems, robot systems, in automotive engineering or in automatic placement machines or filling installations. If, for example, liquids are intended to be filled into containers and the latter are intended to be conveyed to further process steps in the automation installation, it is important to move the filled containers as smoothly as possible so that the liquid does not leak. Jerk-limited, time-minimized motion control is also important in other fields, for example robotics.

BACKGROUND

In modern machine and installation construction, the process acceleration and the reduction of cycle and clock times with constant or increased precision are the main challenge for increasing the throughput and enhancing the quality. An important aspect when developing powerful processing machines is therefore the dynamically favorable configuration of their movement sequences. The aim of the motion planning process may be to achieve peak clock rates which are as high as possible or—alternatively—wear which is as low as possible and downtimes which are as short as possible for stipulated nominal clock rates. Therefore, when configuring the movements, various technical parameters need to be weighed up against one another, such as a permissible velocity, acceleration, and the avoidance of acceleration jumps, that is to say, the limitation of jerk.

The related art discloses the practice of automatically generating movement profiles which are jerk-limited, have a minimum execution time and comply with other demands imposed on the movement operation (for example restrictions of velocity and/or acceleration).

EP 2 307935 B1 thus shows a method in which different kinematic cases are checked in a decision tree in order to solve a non-linear system of equations. On account of its complexity, this method is not suitable for use in systems in which the trajectory generator must be implemented on compact, less complex microcontrollers which can process only less code, in particular. On account of the complexity of the method described in the EP specification mentioned, it is too comprehensive for simple applications.

Macfarlane and Croft in "S. Macfarlane and E. A. Croft: Jerk-Bounded Manipulator Trajectory Planning: Design for Real-Time Applications, in: IEEE Transactions on Robotics and Automation, 19(1), pages 42 to 52, February 2003," describe an online method for calculating smooth jerk-bounded trajectories which are represented by fifth-order polynomial functions. Complex mathematical calculations, such as cube roots from time to time, are required in this case. A specific conversion into a simple method for controlling a motion controller, in which only basic types of calculations are required and which can therefore be efficiently implemented in hardware using commercially available components, is not described here.

SUMMARY

An object of the present disclosure is to provide a robust and simple (fast) method (which is not very susceptible to errors) for automatically generating trajectories, which method does not require much memory and has a calculation time which is as short as possible.

The object is achieved with the exemplary methods, computer programs, drive systems, and trajectory generators disclosed herein.

According to a first aspect, the disclosure relates to a computer-aided method for automatically calculating trajectories for controlling end effectors of a drive system, for example an individual axis of the drive system, from a starting state into an end state for a predefined path, having the following method steps:

capturing the starting state having a starting position and a start velocity and optionally a starting acceleration;

capturing an end state having an end position and an end velocity;

reading in limit values for a maximum acceleration, a maximum jerk, and a maximum velocity; the limit value for the braking acceleration can also be optionally read in and processed; and using a calculation method to calculate a trajectory from the captured starting state into the captured end state from a center velocity to be calculated while minimizing a trajectory time; wherein the calculation method first checks whether the limit value read in for the maximum velocity (with a positive or negative sign) provides a permissible solution in order to get from the captured starting state to the captured end state and, if so, defines this velocity limit value which has previously been read in (that is to say the limit value read in for the maximum velocity) as the center velocity and otherwise uses an iterative optimization method to determine the center velocity in a search interval between a lower search interval limit and an upper search interval limit, wherein the two search interval limits are calculated by two different calculating methods, and wherein the calculation method for calculating the trajectory allows the captured start velocity and/or the captured end velocity to be temporarily above the permissible limit value for the velocity.

An advantage of the method can be seen in the fact that the start and end velocities and the starting and end positions can have any desired signs. Furthermore, only little code is needed to provide the result of the calculation method for calculating the trajectory. It can therefore have a very simple structure and only 7 segments are required or, if it is necessary to reduce the starting acceleration, 8 segments are required.

On account of the technical requirements, such as the reduction of mechanical wear, it is necessary to limit the temporal rate of change of the acceleration or deceleration, that is to say the jerk. This is also implemented in the calculation method proposed here. In order to reduce velocities in servomotors and transmissions or to optimize the effective torque in servomotors for example, a trajectory with the insertion of regions of constant velocity and jerk limitation in the center of the movement section is helpful. The kinematic equations for producing jerk-free path planning are sufficiently well known. In principle, the boundary conditions for the movement which are specified in the limit values are intended to be complied with and a movement which has as much time optimization as possible is intended to be planned at the same time.

As a result, the method provides an automatically calculated trajectory which has time optimization (is optimized with respect to time) and complies with the limit values under defined conditions or in phases. The result may likewise be displayed (graphically and/or numerically) on a user interface. The result may also comprise commands for controlling actuators of the drive system.

The aim of the calculation is to avoid the movement on the generated (desired) trajectory violating the captured limit values or conditions for the respective drive system as far as possible. However, the method allows the captured start velocity or the captured end velocity to be above the respective limit value for the velocity and only then violates the limited velocity or the captured limit value for the velocity.

The terminology of this application is specified below.

The drive system is used to move a physical, mechanical or other object, for example to move a component (electric motor, hydraulic pump, etc.), in a technical system (CNC machine or robot). It may be a single-axis or multi-axis drive system having a linear movement profile and/or a drive system having a rotary movement pattern (for example rotary axle in a vehicle).

The drive system can be used, for example, to control movement in electrical or pneumatic installations. The drive system may also be formed in a robot system. The drive object is an object to be moved and may be part of a motor, a transmission or a piston/cylinder arrangement. The drive object is driven by an actuator. A control unit may be provided in order to control the actuator with predefined desired values or reference variables. A driver or an amplifier may be provided in order to convert the control signals from the control unit (for example motion controller) into kinetic energy in order to move the actuator.

The method is used to automatically calculate a trajectory in a computer-aided manner. Control data can be calculated from the calculated trajectory and are converted, as predefined desired values, into commands for driving actuators of the drive system according to the generated trajectory.

Trajectory is understood as meaning the specification of a time-dependent stated location for the object to be moved. The trajectory describes a temporal course on a movement path with the velocity, acceleration and jerk thereof (as a derivative of the acceleration with respect to the time). The method therefore generates details of where or at which position on a predefined movement path the respective drive object is intended to be at which time.

Trajectory generation is understood as meaning the task of finding a description of the path to be traveled from a starting configuration or a starting state into an end configuration (end state). Geometric and kinematic parameters must be calculated for this purpose. A soft trajectory (with soft transitions) can be calculated using polynomial functions of a suitable order.

According to an exemplary embodiment of the disclosure, the trajectory to be calculated comprises up to seven segments if a possibly existing starting acceleration has been reduced to 0. In this exemplary embodiment, the calculated trajectory is a conventional 7-segment trajectory. The trajectory or the relevant data records can then be calculated further in order to evaluate polynomials and calculate control data for the drive system. Values for the variables of location, velocity, acceleration and jerk each have a polynomial representation. If it is necessary to reduce the starting acceleration, a segment is added, with the result that there are a total of 8 segments (with the additional starting acceleration segment≠0).

The movement segments are defined as follows:

If necessary, segment 0: reduction of existing residual acceleration with maximum jerk, if present.

Segment 1: constant jerk in order to achieve the required acceleration rate. The segment ends as soon as the necessary acceleration has been reached.

Segment 2: constant acceleration segment in which the jerk has the value "0". The segment ends when a jerk has to be controlled for the purpose of changing the acceleration/deceleration.

Segment 3: constant jerk in order to reduce the acceleration. The segment ends when the acceleration reaches the value "0".

Segment 4: since the velocity is constant in this central segment, all higher derivatives of the velocity, that is to say the jerk and the acceleration in particular, have the value "0". The velocity in this segment is referred to as the center velocity.

Segment 5: constant jerk in order to control the increase in the braking operation. The segment ends when a constant braking rate (deceleration rate) can be achieved and the jerk assumes the value "0" or if it is necessary to reduce the braking rate in order to reach the end state.

Segment 6: jerk has the value "0" and the braking rate is constant. The segment ends when a jerk has to be controlled, that is to say when the jerk no longer has the value "0".

Segment 7: constant jerk in order to control the decrease in the braking operation. The segment ends when the end state has been reached.

In principle, the 8 segments are defined by the starting state, the end state, the limit values and possibly by the conditions and the center velocity.

There are 4 coefficients k0 to k3 and a duration T for each segment. In the range from 0 to T, the jerk, acceleration, velocity, and position within a segment are given as:

$$j(t)=6*k3$$

$$a(t)=6*k3*t+2*k2$$

$$v(t)=3*k3*t^2+2*k2*t+k1$$

$$s(t)=k3*t^3+k2*t^2+k1*t+k0,$$

where j denotes the jerk, a denotes the acceleration, v denotes the velocity, s denotes the distance or position, and t denotes the time.

The method comprises a number of input variables:

a starting position, a start velocity and a starting acceleration which are combined as the starting state; the starting state may be, for example, the current actual state of the drive system;

an end position and an end velocity which are combined as the end state;

limitations or permissible limit values (limits) and/or conditions for the velocity, acceleration, braking acceleration and jerk which must be complied with by the drive system during the planned movement. The limit values are, in particular, maximum values which should not be exceeded.

In a typical embodiment of the disclosure, the limit values are values which should be complied with during movement. However, it is also possible to define more complex conditions from different limit values, which comprise a combination of these limit values (for example limit velocity <[value x] AND braking acceleration <[value y]).

The input variables are typically captured automatically. For this purpose, they may be read from a memory and read in via a corresponding interface, for example from a programmable logic control module (PLC) or from a database. Alternatively or additionally, they may be partially or completely input via inputs on a user interface.

Inconsistent inputs (for example manual inputs by a user, for example limit values=0) may typically be detected and corrected by simple querying (for example of program variables). That is to say, an error message or a corresponding signal, which is output on a user interface, is automatically generated for inputs which would result in an unachievable trajectory. No complicated calculations have to be carried out. Inconsistent inputs can therefore be easily captured by means of a query without further calculations having to be carried out.

The calculation method is based on an efficient algorithm. The algorithm on which the calculation method is based has low complexity O(1). It contains only a few simple calculation rules. This has the technical effect that the processor load can be reduced, and the performance of the trajectory calculation can be increased. The calculation method described in this application advantageously carries out only calculations for paths from a starting position to an end position. Multi-segment trajectories can be accordingly broken down. The calculation method is therefore implemented without recursions. This results in the important technical advantage that the method can be implemented very efficiently in hardware using commercially available components.

The trajectory time is intended to be optimized. This means that the travel time of the object to be respectively moved, for example an axle of a linear drive or a rotary axle, is minimized, that is to say the time needed to move along or carry out the calculated trajectory (the duration of the trajectory).

The method checks whether there is a permissible solution for selected velocity values in order to get from the starting state to the end state while complying with the limit values and/or conditions in phases. This check is carried out by means of an automatic calculation. Compliance with the limit values "in phases" means that it is permitted for the limit values not to be complied with at particular times (that is to say at particular points of the trajectory). However, the calculation method ensures that there is at least one point of the trajectory to be calculated at which all limit values are guaranteed to be complied with.

The calculation method is used to calculate a center velocity. The trajectory for all segments and with all values completely results from the calculated center velocity.

The optimization method is used to numerically optimize the travel time or trajectory time. In this case, the limit values must be complied with and the movement must lead from the starting state into the end state. The optimization variable is the center velocity. According to one advantageous embodiment of the disclosure, a search for the center velocity is carried out in both directions in the optimization method, which, although increasing (in particular doubling) the calculation time, guarantees that the optimum solution is always approximated.

A solution is permissible when it leads from the starting state into the end state, in other words when the duration of the segment with a constant velocity has the value "0" or is positive. According to one aspect of the disclosure, the permissible solution is subjected to an optimization method, if necessary, in order to minimize the trajectory time.

As a result of the method, a center velocity is calculated or determined to calculate a trajectory therefrom, taking into account the input variables which have been captured and read in. According to an exemplary embodiment of the disclosure, yet further results may be provided, comprising control data for controlling the drive system and signals for graphically outputting the calculated trajectory on a user interface. The following further results can therefore be typically calculated:
- a number of the segments,
- a duration of each of the segments,
- a jerk profile in each of the segments—this can be represented, for example, on the user interface in a conventional polygon representation,
- an acceleration profile in each of the segments—for example in the form of a polygon representation,
- a velocity profile in each of the segments—for example in the form of a polygon representation,
- a position profile in each of the segments—for example in the form of a polygon representation.

The result and the further results are typically output on a user interface, for example a graphical user interface.

The trajectory is fully calculated before carrying out the movement. When controlling the end effectors and actuators of the movement system during the movement, the trajectory must only be sampled and therefore captured only at individual points.

According to another exemplary embodiment of the disclosure, a desired calculation time value of the calculation method and/or a desired accuracy value of the trajectory to be calculated can be configured. It is therefore possible to configure, in a configuration phase, how the calculation method is intended to be designed with regard to the calculation time (performance) and with regard to the accuracy (optimization quality). In this case, the calculation time and the accuracy are inversely proportional. Therefore, one advantageous development provides for only one of the two values (desired calculation time value or desired accuracy value) to be configured and for the respective other value to be automatically determined therefrom. Alternatively, it is also possible to configure a relationship between the desired values. The configurations from the configuration phase are typically input via the user interface. In this case, one advantageous development of the disclosure provides for inconsistent inputs to be automatically corrected by generating and outputting a proposed correction for the desired calculation time value and/or the desired accuracy value.

According to another exemplary embodiment of the disclosure, the first calculating method for calculating the lower limit of the search interval comprises the following steps of:
- defining "+/−0" (smallest possible value greater than/less than 0) as the lower limit if a solution cannot be found for a start velocity of the captured starting state and a solution cannot be found for an end velocity of the captured end state;
- defining the start velocity as the lower limit if a solution can be found for the start velocity and a solution cannot be found for the end velocity;
- defining the end velocity as the lower limit if a solution cannot be found for the start velocity and a solution can be found for the end velocity; and
- checking whether a solution can be found both for the start velocity and for the end velocity and, if so: calculating which of the two velocities has the shorter trajectory time, and defining that velocity which has the shorter trajectory time as the center velocity.

According to another exemplary embodiment of the disclosure, a center velocity is output as the solution for all starting and end states. The method therefore has the technical advantage that a solution can be calculated and therefore ensured in a guaranteed manner.

According to another exemplary embodiment of the disclosure, the captured start velocity and/or the captured end velocity can exceed the limit value respectively read in for the maximum velocity, at least at certain points, on the trajectory to be calculated, but is complied with at at least one point of the trajectory to be calculated. The limit value read in for the velocity is guaranteed to be complied with in the calculated trajectory if the start and end velocities are below this limit value. The calculation method is designed such that the calculated center velocity always complies with the captured limit value for the maximum velocity, that is to say is always below the limit value. If, for example, the captured end velocity is above the captured limit value for the maximum velocity, this is achieved by means of an acceleration in subsequent segments. The algorithm for the calculation method proposed here has the property that the limit velocity is complied with at at least one time in the trajectory. This is explained using the following example. If the start velocity is 200 mm/s but the limit value for the maximum velocity is only 100 mm/s, the calculation method checks a trivial solution at the limit value (that is to say at 100 mm/s) and not at 200 mm/s. The higher start velocity of 200 mm/s is nevertheless taken into account when calculating the trajectory.

According to another exemplary embodiment of the disclosure, the optimization method carries out optimization according to the maximum velocity by iteratively shifting the upper and/or lower search limit in order to restrict the search interval. The optimization method is typically implemented as an optimization algorithm in order to iteratively algorithmically calculate a numerical approximation for a maximum value for the center velocity in a search interval. It is possible to use different optimization methods which must have a limited run time, however, in order to guarantee the O(1) complexity of the method. As a result, the optimality of the trajectory time calculation cannot be guaranteed. A golden ratio method is used in one exemplary embodiment. This is a mathematical non-linear optimization method. In particular, it algorithmically calculates a numerical approximation for an extreme point (minimum or maximum) of a real function of a variable in a search interval. It is based on the analytical use of the originally geometrically defined constant division. In contrast to the interval bisecting method, the search interval is not bisected in each step here, but rather is reduced according to the golden ratio principle. The parameter τ used has not assumed the value ½ here, as in the interval bisecting method. If it is assumed that each point in each interval may have the same likelihood of being an extreme point, this results, in the case of uncertainty intervals, in the golden ratio method being 14% more effective, for example, than the interval bisecting method which, however, can be alternatively used for the disclosure.

According to another advantageous embodiment of the disclosure, control data for the drive system are calculated from the calculated trajectory and are used to directly control the drive system. Alternatively or additionally, the calculated trajectory can be output on the user interface, for example in the form of a graphical representation.

According to another advantageous embodiment of the disclosure, the calculation method and the method overall have real-time capability. For the term "real-time capability", reference is made to the German standard DIN 44 300. The data results (here: calculated trajectory) are available within a predefined period.

According to another exemplary embodiment of the disclosure, the starting state and/or the end state is/are captured and the limit values are read in by accessing an electronic module of a programmable logic controller. The values are therefore not manually input by a user by hand via the user interface, but rather are automatically captured by accessing a data memory. The values to be read in and captured can also be stored in a database of the drive system and read in from there.

According to yet another exemplary embodiment of the disclosure, the method is implemented on a microcontroller. The method can therefore run directly in a comprehensive technical system, for example in a motor controller, and can be provided as an "embedded system". It is also possible for the method to be indirectly provided for the technical system and to be implemented, for example, in an additional module for a motion controller.

According to a further exemplary embodiment of the disclosure, before carrying out the calculation method, it is checked whether there is a residual acceleration in the starting state, and if so, the following method steps are carried out:
  reducing the captured residual acceleration to zero, for example linearly while complying with the limit value for the jerk, and then
  capturing the updated position and the updated velocity as the starting state.

A residual acceleration may occur, for example, when a previous trajectory, and therefore a movement currently being carried out, has been interrupted early.

According to another aspect, the disclosure relates to a computer program for a drive system, which computer program can be loaded into an internal memory of an analog or digital arithmetic unit and comprises software routines which are used to carry out the steps of the method described above when the software routines are executed on the arithmetic unit.

According to another aspect, the disclosure relates to a trajectory generator for automatically calculating a trajectory for a drive system from a starting state into an end state on a predefined path, comprising:
  an input interface which is intended to capture the starting state and the end state and to read in limit values for a maximum acceleration, a maximum jerk and a maximum velocity;
  an arithmetic unit which is intended to carry out a calculation method for calculating a trajectory from the captured starting state into the captured end state in such a manner that a trajectory time is minimized;
  wherein the arithmetic unit also comprises:
  a checking unit which is intended to check whether the limit value read in for the velocity has a permissible solution in the positive or negative direction in order to get from the starting state to the end state, and if so, defines this limit value which has been read in as the center velocity;
  an optimizer which is intended to carry out a first calculating method for calculating a lower limit of a search interval and is intended to carry out a second calculating method for calculating an upper limit of the search interval, wherein the optimizer is also intended to carry out an iterative optimization method for determining the center velocity in the search interval.

In an exemplary embodiment of the disclosure, the trajectory generator comprises an output interface on which the calculated center velocity and the calculated trajectory are provided. It is also possible to provide the trajectory generator as an additional module for a motion controller.

According to another aspect, the disclosure relates to a control apparatus for controlling end effectors of a drive system from a starting state into an end state on a predefined path on the basis of a trajectory which is to be calculated and has been calculated using a trajectory generator.

An object of the disclosure is also achieved by a computer program product for a drive device or system, which computer program product is or can be loaded into a memory of a computer or of an electronic or mechatronic device and has a computer program for carrying out the method described in more detail above when the computer program is executed on the computer or the device. In addition to the computer program, the computer program product may comprise further components.

An object is also achieved by a computer program for carrying out all method steps of the method described in more detail above when the computer program is executed on a computer, an electronic or mechatronic device. In this case, it is also possible for the computer program to be stored on a medium which can be read by the computer or the electronic or mechatronic device. The computer program may be loaded into an internal memory of a digital control unit.

Exemplary embodiments which should not be understood as restrictive are discussed in the following detailed description of the figures with their features and further advantages on the basis of the drawings.

DESCRIPTION OF EXEMPLARY EMBODIMENTS

The disclosure is described in more detail below on the basis of exemplary embodiments in connection with the drawings.

With regard to the use of mathematical symbols: The symbol |vmax| is used below. This mathematical symbol is intended to represent the absolute value of vmax and is therefore synonymous with absolute value (vmax).

The disclosure improves the motion control of a linear or rotary drive system. The drive system can be driven in a pneumatic, servo-pneumatic or electromechanical manner. The motion control is intended to be improved with regard to the trajectory time and with regard to failure and wear and is intended to be highly efficient in this case. The method can be designed in a very efficient manner by simplifying the calculation method for calculating the trajectory. The calculation method is used to calculate the trajectory and, in order to simplify the calculation, implements basic assumptions which enable a considerably faster calculation with an approximately constant accuracy and/or quality.

The disclosure relates, in particular, to a method for automatically calculating trajectories and may comprise the output of control data which are used to control the drive system. The method is typically implemented in an algorithm which has been loaded onto a microcontroller. The algorithm attempts to find a trajectory with the shortest possible duration. It is assumed in this case that a high center velocity is associated with a short duration of the trajectory. The duration is directly calculated from the given input variables and from the calculated center velocity.

Figure 1:
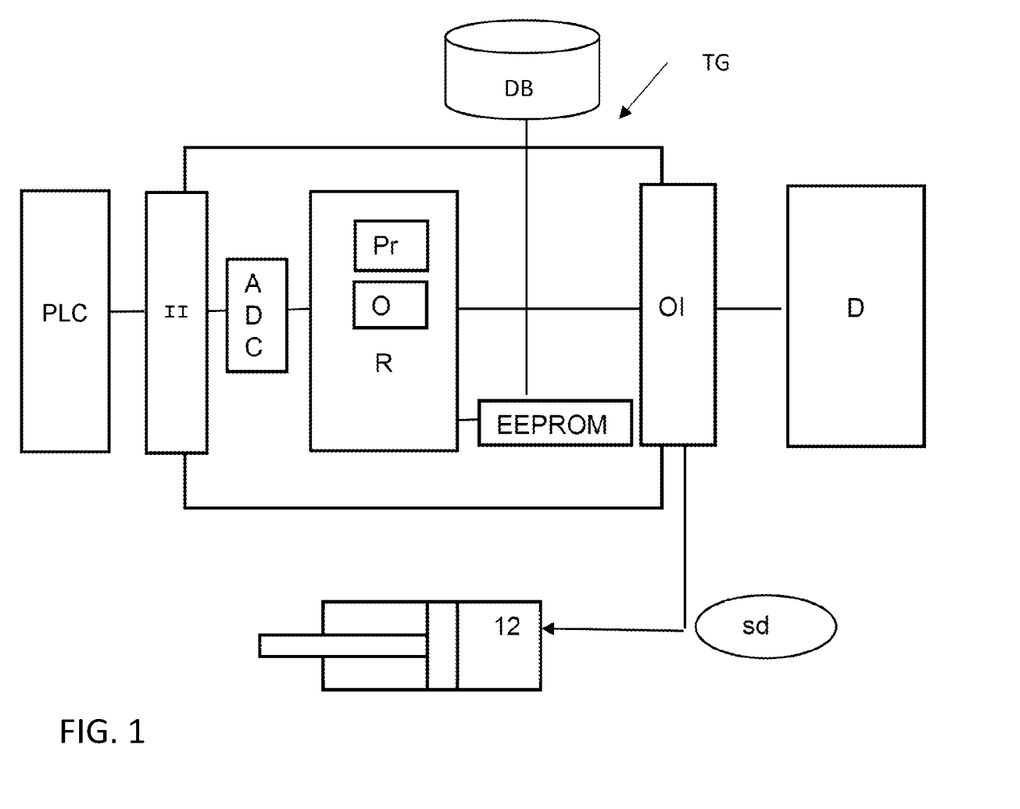
FIG. 1 shows a basic illustration of a trajectory generator according to one exemplary embodiment of the disclosure.

The disclosure relates, in particular, to an automatic trajectory calculation by a trajectory generator TG which is shown in more detail in FIG. 1. The trajectory generator TG may be implemented on a microcontroller μC. The trajectory generator TG comprises an input interface II which is used to capture a starting state and an end state and to read in limit values for a maximum velocity, a maximum acceleration and a maximum jerk. The captured values for the parameters relevant to the trajectory can also be read in from a programmable logic controller PLC or from another external data memory. The starting state comprises a start velocity and a starting position. A starting acceleration may likewise be captured or may be calculated from the above parameters. The end state comprises an end velocity and an end position.

The trajectory generator TG comprises an arithmetic unit R for carrying out the calculation method, memory modules (SDRAM, ROM, RAM etc.) and a non-volatile memory (EEPROM or flash EEPROM) for storing the program. The reference symbol EEPROM is used for the non-volatile memory in the figures; however, the non-volatile memory may also be a flash memory. The arithmetic unit R may comprise an optimizer O and a checking unit Pr. Depending on the configuration, further modules may be additionally integrated, for example an ADC module as an analog/digital converter, in order to convert the input and/or output signals.

The arithmetic unit loads the program stored in the non-volatile memory for carrying out the trajectory calculation method and executes it. As the result, a trajectory for the linear drive which is optimized with respect to the trajectory time is calculated from the input data. The trajectory generated can be output on a connected display D via an output interface OI. Control data sd which are forwarded to the drive system 12 and to the end effectors 14 for motion control can be generated from the calculated trajectory.

The program for carrying out the method may be locally stored in the trajectory generator TG. Alternatively, it may also be centrally stored in a database DB or in a superordinate control unit and can be loaded into the memory EEPROM.

Figure 2:
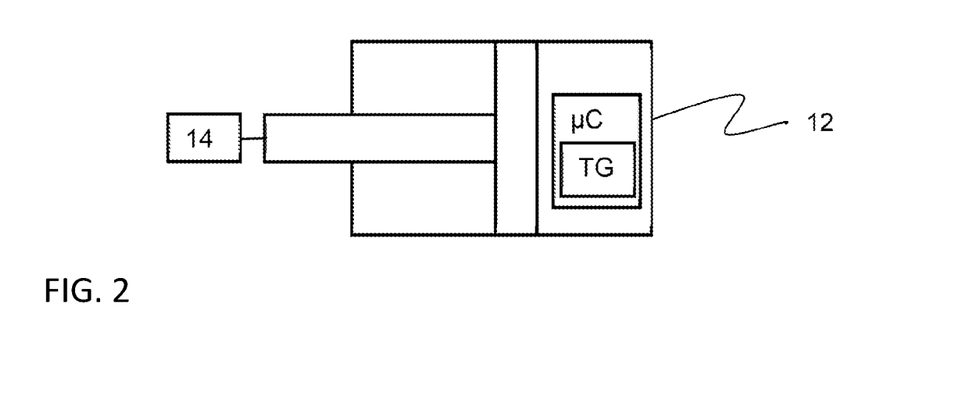
FIG. 2 is a schematic illustration of a drive device, for example a piston/cylinder arrangement, which comprises a microcontroller having a trajectory generator for motion control.

FIG. 2 shows a drive system 12 using the example of a piston/cylinder arrangement in an alternative embodiment. Here, the drive system 12 is not controlled by the external trajectory generator TG via the output interface OI, but rather the drive system 12 itself has a microcontroller onto which the method for calculating the trajectory can be loaded and executed.

A semiconductor chip which contains an arithmetic unit or a processor and also peripheral functions at the same time is referred to here as the microcontroller μC. It also usually comprises the main memory and program memory partially or completely on the same chip. Complex peripheral functions, for example CAN (Controller Area Network), SPI (Serial Peripheral Interface), serial or Ethernet interfaces, LCD controllers and drivers and analog/digital converters, can therefore also be provided on the microcontroller. The arithmetic unit R of the microcontroller or a memory EEPROM can interchange data with an external data memory or a database DB, for example in order to load the program for calculating the trajectory and controlling the drive system. A 4-bit, 8-bit, 16-bit or 32-bit architecture can be used. A 4-bit microcontroller is preferred for simple applications. For a 4-bit architecture, an assembler is typically used as the programming language for the computer-implemented method. It therefore becomes possible to effectively use the scarce resources of these smallest microcontrollers. A high degree of efficiency and a high code density can be advantageously achieved with the method described here.

A sequence according to one preferred embodiment of the disclosure is explained in more detail below in connection with FIG. 3.

The method is divided into two time phases:
A configuration phase and
an execution phase.

The configuration phase is upstream and is used to design the optimization method. Here, a user can define how the relationship between the calculation time and the optimization accuracy is intended to be defined. In this phase, it is also possible to define further conditions for the motion control which are taken into account by the calculation method.

The execution phase is in turn divided into two sections: firstly, the execution of the calculation of the trajectory and of the control data sd (motion planning) and, secondly, an implementation phase in which the object to be moved (actuator, valve etc.) is moved according to the calculated trajectory and the calculated control data sd. FIG. 3 does not explicitly illustrate the implementation phase. It follows step d3 (calculation of the control data sd).

After the method has been started and after the configuration phase has been concluded, the starting state having a starting position and a start velocity, and a starting acceleration is captured in step a.

The desired end state having an end position and an end velocity is captured in step b.

The upper limit values for a (maximum) velocity, a (maximum) acceleration and for a (maximum) jerk are then read in in step c.

For steps a to c, it is possible to access an external memory or a PLC module. Steps a to c can also be carried out in a parallel manner or in a different sequence.

The calculation method for calculating a center velocity and (on the basis thereof) for calculating the trajectory is carried out in step d. The calculation method is designed in such a manner that the travel duration or the time to move along (execute) the trajectory is as short as possible.

In a first step d1, the calculation method checks whether the limit value read in for the maximum velocity provides a permissible solution in order to get from the captured starting state into the captured end state. This has the technical advantage that it becomes possible to very quickly calculate the trajectory from the center velocity without having to carry out complex calculations and numerical optimizations. The design of this method step is based on the observation that it is possible to find a permissible solution for the maximum limit velocity in most cases. A numerical optimization method for searching for the center velocity is used only if this is not possible, in which optimization method the lower search limit is first of all calculated and then the upper search limit is calculated in different calculating methods.

Figure 3:
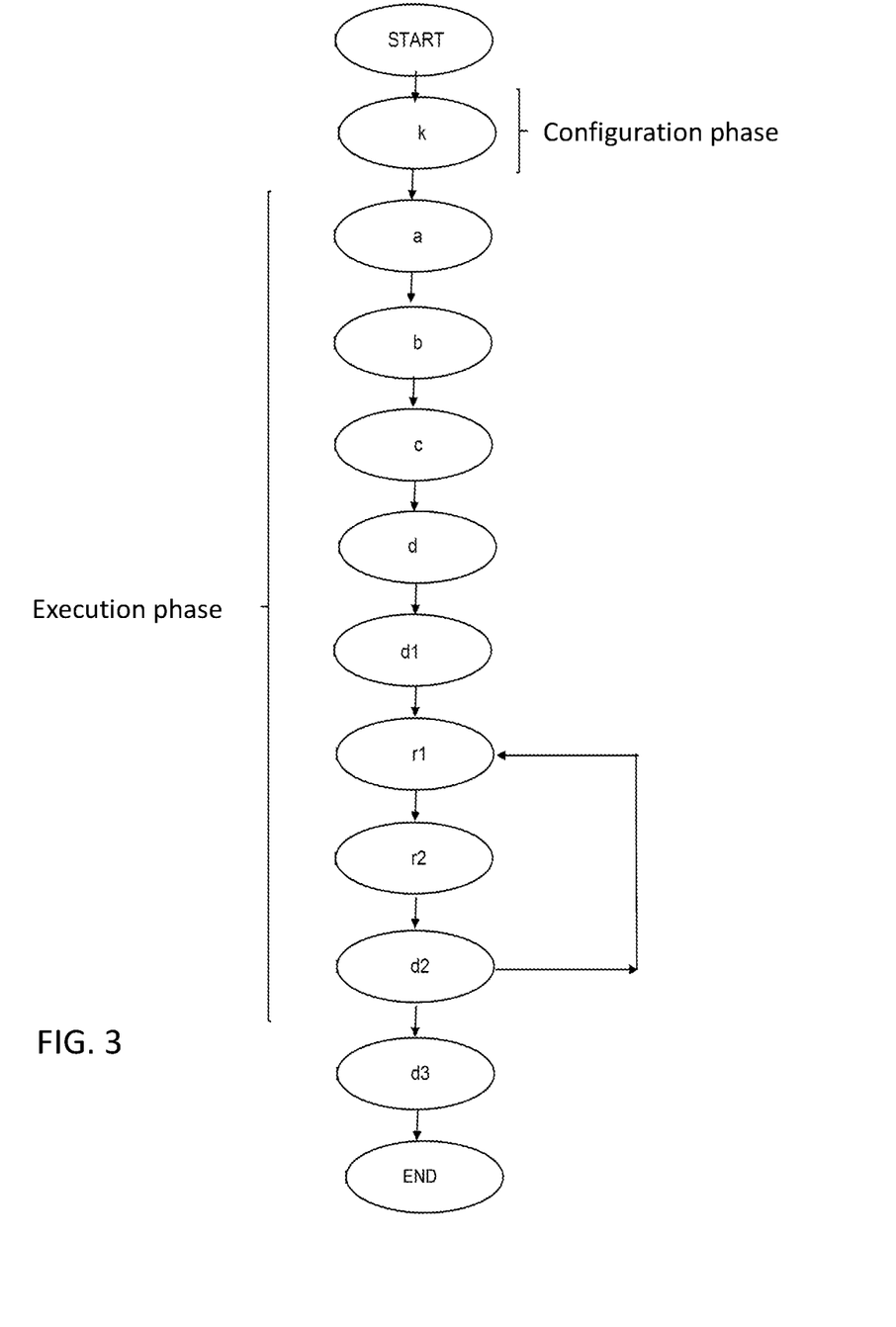
FIG. 3 is a flow hart according to an exemplary embodiment of the method.

In an upstream step which is not illustrated in FIG. 3, the starting acceleration is reduced.

In step r1, a first calculating method is carried out in order to calculate the lower search interval limit.

The aim of the first calculating method is, in any event, to determine a solution which is arbitrarily poor in the mathematical sense (that is to say a solution with a long, non-time-optimized travel duration for example) as the lower search limit (this sequence is the same irrespective of whether the start and end velocities are greater than |vmax|).

The start and end velocities are used as possible center velocities.

If one of the two velocities is above the absolute value of the limit value read in for the velocity |vmax|, |vmax| is respectively used as the possible center velocity instead.

If there is no solution for the start and end velocities, a solution in the region of 0 (e.g., $+1e^{-9}$ or $-e^{-9}$) is searched for and is used as the lower search limit.

If the start velocity provides a solution and the end velocity does not provide a solution, the start velocity is the lower search limit.

If the start velocity does not provide a solution, but the end velocity provides a solution, the end velocity is the lower search limit.

If both velocities provide a solution, the solution with the shorter travel duration is set as the lower search limit.

A pseudocode representation of the first calculating method for determining the lower limit is provided below.

```
i)    t_left := -1
ii)   v_left := -1
iii)  if t_start <> -1 then
        (1) t_left := t_start
        (2) v_left := v_s
iv)   endif
v)    if t_end <> -1 and (t_end < t_left or t_left = -1) then
        (1) t_left := t_end
        (2) v_left := v_e
vi)   endif
vii)  if t_left = -1 then
        (1) # Neither start or end velocity yielded a result
        (2) t_left := t17(0+, ...) # Do we have a solution in positive
            direction (small positive epsilon)
        (3) v_left := 0+
        (4) if t_left = -1 then
              (a) t_left := t17(0-, ...) # We must have a solution in negative
                  direction (small negative epsilon)
              (b) v_left := 0-
        (5) endif
viii) endif
```

A second calculating method is carried out in step r2 in order to calculate the upper search interval limit.

For this purpose, the second calculating method checks whether vmax provides a solution. If this is the case, this is accepted as the best solution.

Under certain circumstances (limitation of a start or end velocity to vmax), this solution may already have been used as the lower search limit in the first calculating method. However, in the time phase of the first calculating method, it is not yet possible to calculate whether this is a solution which cannot be optimized further.

A pseudocode representation of the second calculating method for determining the upper limit is given below.

```
i)    # Limit the search to |v_max|
ii)   if v_left < 0 then
        (1) v_right := -v_max
```

```
    iii) else
         (1) v_right := v_max
    iv) endif
```

After the limits of the search interval have been determined, an iterative optimization method is carried out in step d2 in order to numerically determine the center velocity. The aim of the optimization method is to minimize the travel duration (time to travel along the trajectory) if a time-optimal solution has not been found in the preceding method steps.

In the optimization method in step d2, an attempt is made to iteratively find a better solution as the lower search limit starting from vmax and becoming gradually smaller. However, this may also not provide a result and only the poor solution—and therefore the velocity which has been set as the lower search limit—then remains.

The optimization method has a constant calculation time O (1). Therefore, the number of optimization steps does not depend on the number of input values. The method therefore advantageously has real-time capability.

The optimization method first of all searches for an optimum trivial solution at the upper search limit. Only if this is not possible is a non-optimum trajectory carried out by carrying out the optimization method with a limited duration. In the worst-case scenario, that is to say if a better solution cannot be found, a guaranteed solution is found at the lower search limit. An important technical advantage of the proposed method can be seen in the short calculation time, the high degree of robustness with respect to the input variables and physical conditions. For example, the method certainly leads to a result even when the start velocity and/or the end velocity is/are above the limit value for the velocity.

The center velocity is provided as the result of the method. Further values for the trajectory, such as the number of segments and their duration (and therefore also the duration of the entire trajectory), and the temporal profiles for jerk, acceleration, velocity and position in each of the segments can then be calculated from the center velocity and the data which have been captured and read in. These further results can also be forwarded to the display D for output, in particular as a polygon representation or as a representation of the polynomial functions to be calculated, for example.

The result and the further results are typically used to determine control data sd which are then used to control the drive system 12. This is carried out in step d3 as a downstream method step. The control data sd may be control signals which are based on the respective drive system. A rotary drive therefore requires different control signals, in the form of angle-based instructions, than a linear drive, for example. This is taken into account when generating the control signals sd and can be accordingly configured in the configuration phase using the configuration inputs in step k.

The method is ended after calculating the trajectory d2 and the control data sd in step d3.

A pseudocode representation of the algorithm is given below.

```
i)     # Returns either a positive time for the given cruise velocity or −1 if no solution exists
ii)    func t17(v, s_end, v_start, v_end, v_max, a_max, d_max, j_max) -> time or −1
iii)   func segs(v, s_start, s_end, v_start, v_end, v_max, a_max, d_max, j_max) -> up to 7 segments
iv)    # Clamp v_start/end to +/− v_max
v)     if v_start > v_max then
           (a) v_s := v_max
vi)    elif v_start < −v_max then
           (a) v_s := −v_max
vii)   else
           (a) v_s := v_start
viii)  endif
       (1) if v_end > v_max then
           (a) v_e := v_max
ix)    elif v_end < −v_max then
           (a) v_e : = −v_max
x)     else
           (a) v_e := v_end
xi)    endif
       (1) t_start := t17(v_s, ...)
xii)   t_end := t17(v_e, ...)
xiii)  t_right := t17(v_right, ...)
xiv)   if t_right >= 0 then
           (1) # We found the optimal solution
           (2) v_cruise := v_right
xv)    else
           (1) # Do a time/complexity limited optimization search (e.g. golden ratio search)
           (2) # between v_left and v_right for the lowest t17. Any value with a solution
           (3) # between v_left and v_right is acceptable! We can guarantee a solution, because
           (4) # v_left is a valid solution.
           (5) v_cruise := optimize(v_left, v_right, t17)
xvi)   endif
xvii)  # <<< ORC
xviii) trajectory := segs(v_cruise, s_start, s_end, v_start, v_end, v_max, a_max, d_max, j_max)
```

Figure 4:
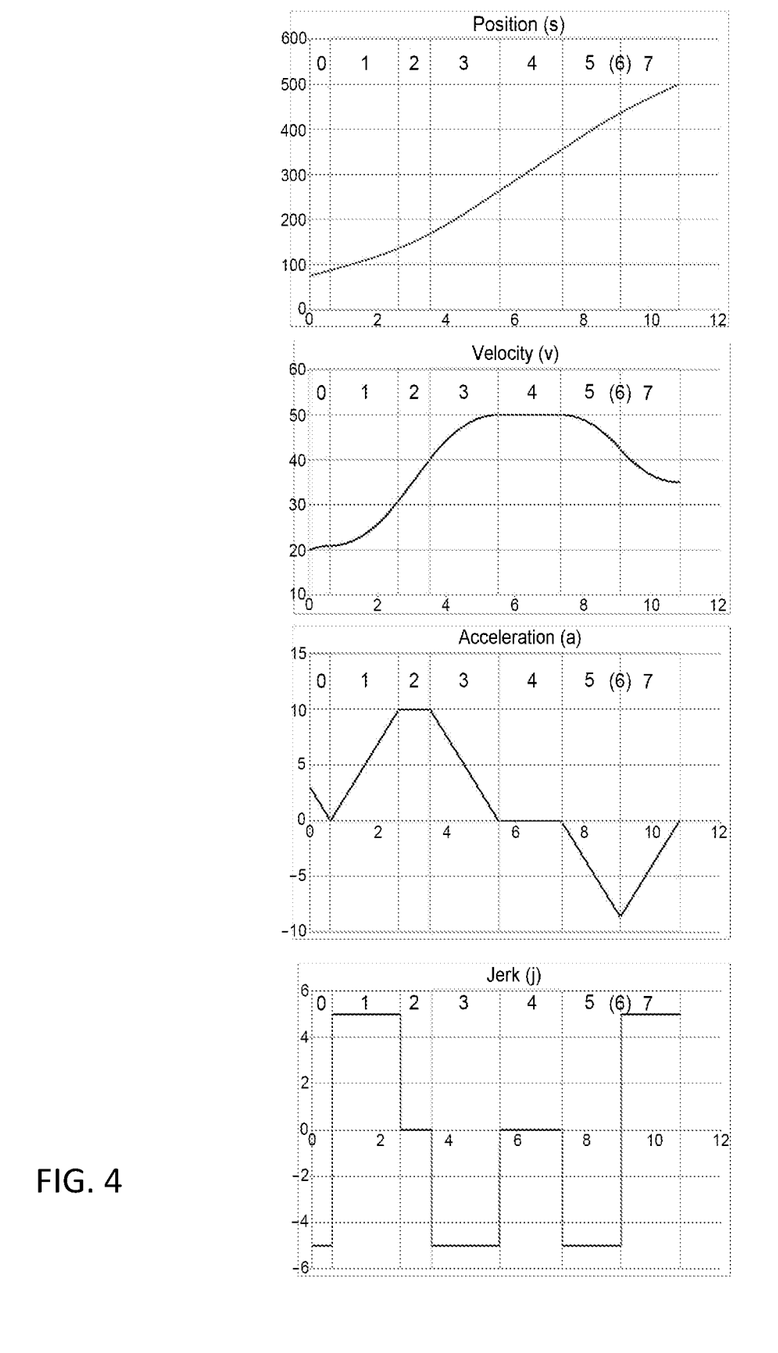
FIG. 4 shows a graphical illustration of a calculated trajectory a plurality of segments in an exemplary form.

FIG. 4 shows a calculated trajectory having a plurality of (eight) segments in an exemplary embodiment for particular values with a polygon representation for position, velocity, acceleration and jerk.

The calculated trajectory is based on the following values:

|         |     |
|---------|-----|
| s_start | 75  |
| v_start | 20  |
| a_start | 3   |
| s_end   | 500 |
| v_end   | 35  |
| v_max   | 50  |
| a_max   | 10  |
| d_max   | 10  |
| j_max   | 5   |

| Segment | Duration | k3     | k2     | k1     | k0      |
|---------|----------|--------|--------|--------|---------|
| 0       | 0.600    | −0.833 | 1.500  | 20.000 | 75.000  |
| 1       | 2.000    | 0.833  | 0.000  | 20.900 | 87.360  |
| 2       | 0.910    | 0.000  | 5.000  | 30.900 | 135.827 |
| 3       | 2.000    | −0.833 | 5.000  | 40.000 | 168.086 |
| 4       | 1.827    | 0.000  | 0.000  | 50.000 | 261.420 |
| 5       | 1.732    | −0.833 | 0.000  | 50.000 | 352.776 |
| 6       | 1.732    | 0.833  | −4.330 | 42.500 | 435.048 |

In one exemplary embodiment of the disclosure, the algorithm plans the trajectory with 7 segments but only for a starting acceleration which has the value "0" or has been reduced to the latter. If there is still a residual acceleration during starting and it is necessary to reduce it, the algorithm contains an addition in which up to eight segments are produced.

In FIG. 4, a segment 6 is inserted between parentheses between the fifth and seventh segments and is intended to represent the fact that a segment (in this case segment 6) can have the length "0". Accordingly, the respective next (last) segment is denoted "7". Otherwise, the last segment would not be denoted "7", but rather with the number "6", in a different representation in FIG. 4 and would be illustrated as the seventh segment.

In summary, the disclosure is aimed at algorithmically and therefore automatically calculating a time-optimized and jerk-limited trajectory on the basis of captured input signals (starting state, end state, limit values), in which case the calculation method for the trajectory or the algorithm has a very short runtime (and therefore has real-time capability) and is simple. The calculation method requires only a few code lines. As a result of the simple structure, the method has a very low susceptibility to errors and is therefore easier to maintain.

The method can automatically calculate control data sd which are then read in for the purpose of controlling actuators or end effectors 14 in the drive system 12 and are converted for the purpose of carrying out the movement according to the calculated trajectory.

Finally, it is pointed out that the description of the disclosure and the exemplary embodiments should fundamentally not be understood as being restrictive with respect to a particular physical implementation of the disclosure. All features shown and explained in connection with individual embodiments of the disclosure can be provided in a different combination in the subject matter according to the disclosure in order to simultaneously achieve their advantageous effects. Therefore, in addition to a piston/cylinder arrangement, it is likewise within the scope of the disclosure to control the movement of other drive means 12 and to move them in an optimized manner, for example. This may be, for example, a pneumatically or servo-pneumatically operated drive system or an electromechanical system, for example a robot system. The method of the disclosure can be implemented not only on microcontrollers μC of a particular architecture, but also for other processors of a computer-aided component which interchanges data with the respective drive system which needs to be controlled with respect to carrying out the movement.

Furthermore, the components of the trajectory generator TG for calculating the trajectory and for controlling the movement may be implemented in a manner distributed over a plurality of physical products. For example, the method for calculating the trajectory and for calculating the control data sd may be completely implemented on the drive system 12. It is likewise possible for the method to be carried out on an external, separate module and to forward only the control data sd to the drive system 12 for control. It is also possible for individual components of the trajectory generator TG to be implemented on different entities. In particular, the optimizer O can be formed on an entity other than the checking unit Pr, in which case the interchange of data between the entities is ensured.

The scope of protection of the present disclosure is given by the claims and is not restricted by the features explained in the description or shown in the figures.

The foregoing description of the exemplary embodiments of the disclosure illustrates and describes the present disclosure. Additionally, the disclosure shows and describes only the exemplary embodiments but, as mentioned above, it is to be understood that the disclosure is capable of use in various other combinations, modifications, and environments and is capable of changes or modifications within the scope of the concept as expressed herein, commensurate with the above teachings and/or the skill or knowledge of the relevant art.

The term "comprising" (and its grammatical variations) as used herein is used in the inclusive sense of "having" or "including" and not in the exclusive sense of "consisting only of." The terms "a" and "the" as used herein are understood to encompass the plural as well as the singular.

All publications, patents and patent applications cited in this specification are herein incorporated by reference, and for any and all purposes, as if each individual publication, patent or patent application were specifically and individually indicated to be incorporated by reference. In the case of inconsistencies, the present disclosure will prevail.

The invention claimed is:

1. A computer-aided method for calculating trajectories for controlling end effectors of a drive system from a starting state into an end state on a predefined path, the method comprising: —capturing a starting state and an end state; —reading in limit values for an acceleration, a jerk, and a velocity, respectively; —calculating with a calculation method a trajectory from the captured starting state into the captured end state to minimize a trajectory time, wherein the calculation method includes: —checking whether a read-in limit value for the velocity has a permissible solution in a positive or negative direction to get from the starting state to the end when the read-in limit value for the velocity has the permissible solution in the positive or negative direction to get from the starting state to the end state, defining the read-in limit value as a center velocity; and when the read-in limit value for the velocity does not have the permissible solution in the positive or negative direction to get from the starting state to the end state: —carrying out a first calculating method for calculating a lower limit of a search interval; —carrying out a second calculating method for calculating an upper limit of the search interval; and —determining the center velocity in the search interval with an iterative optimization method, controlling the drive system for carrying out a movement, and wherein the iterative optimization method carries out optimization according to the velocity by iteratively shifting at least one of the upper or the lower search limit to restrict the search interval.

2. The method as claimed in claim 1, wherein the trajectory to be calculated comprises up to seven segments, and wherein control data for controlling the end effectors are calculated from the trajectory.

3. The method as claimed in claim 1, further comprising:
calculating further results from the determined center velocity as the result and the captured input variables which have been read in, the further results being selected from one or more of:
a number of the segments,
a duration of each of the segments,
a jerk profile in each of the segments,
an acceleration profile in each of the segments,
a velocity profile in each of the segments, or
position profile in each of the segments.

4. The method as claimed in claim 1, further comprising:
configuring at least one of a desired calculation time value of the calculation method or a desired accuracy value of the trajectory to be calculated.

5. The method as claimed in claim 1, wherein the first calculating method for calculating the lower limit of the search interval comprises:
defining "0" as a lower limit if a solution cannot be found for a start velocity of the captured starting state and for an end velocity of the captured end state;
defining a start velocity as the lower limit if a solution can be found for the start velocity and a solution cannot be found for the end velocity;
defining the end velocity as the lower limit if a solution cannot be found for the start velocity and a solution can be found for the end velocity;
checking whether a solution can be found both for the start velocity and for the end velocity and, if so:
calculating which of the two velocities has the shorter trajectory time, and
defining that velocity which has the shorter trajectory time as the center velocity.

6. The method as claimed in claim 1, wherein a center velocity is output as the solution for all starting and end states.

7. The method as claimed in claim 1, wherein at least one of the captured start velocity or the captured end velocity exceeds the limit value respectively read in for the velocity, at least at certain points, on the trajectory to be calculated, but is complied with at least one point of the trajectory to be calculated.

8. The method as claimed in claim 1, wherein the limit value read in for the velocity is guaranteed to be complied with in the calculated trajectory if the captured start velocity and the captured end velocity are below the read-in limit value for the velocity.

9. The method as claimed in claim 1, wherein the optimization method is based on a golden ratio method.

10. The method as claimed in claim 1, wherein the control data for the drive system are calculated from the calculated trajectory.

11. The method as claimed in claim 1, wherein the method has a real-time capability.

12. The method as claimed in claim 1, wherein at least one of the starting state or the end state is captured, and the limit values are read in by accessing a programmable logic controller.

13. The method as claimed in claim 1, wherein the method is implemented on a microcontroller.

14. The method as claimed in claim 1, wherein, before carrying out the calculation method, it is checked whether there is a residual acceleration in the starting state, and if so, the following method steps are carried out:
reducing a captured residual acceleration to zero and then:
capturing the updated position and the updated velocity as the starting state.

15. A non-transitory computer-readable storage medium encoded with a computer program for controlling the movement of a drive system, which computer program can be loaded into an internal memory of a microcontroller and comprises software routines for carrying out the method as claimed in claim 1 when the software routines are executed on the microcontroller.

16. A trajectory generator for automatically calculating a trajectory for a drive system from a starting state into an end state on a predefined path, the trajectory generator comprising:
an input interface configured to capture a starting state and an end state and to read in limit values for an acceleration, a jerk, and a velocity, respectively; and
an arithmetic unit configured to carry out a calculation method for calculating a trajectory from the captured starting state into the captured end state to minimize a trajectory time;
wherein the arithmetic unit includes:
a checking unit configured to check whether the limit value read in for the velocity has a permissible solution in a positive or a negative direction to get from the starting state to the end state, and if so, defines this limit value which has been read in as the center velocity; and
an optimizer configured to carry out a first calculating method for calculating a lower limit of a search interval, a second calculating method for calculating an upper limit of the search interval, and an iterative optimization method for determining the center velocity in the search interval, wherein the iterative optimization method carries out optimization according to the velocity by iteratively shifting at least one of the upper or the lower search limit to restrict the search interval.

17. The trajectory generator as claimed in claim 16, wherein the trajectory generator comprises an output interface on which the calculated center velocity, the calculated trajectory, and control data for controlling the drive system are provided.

18. The trajectory generator as claimed in claim 16, wherein the trajectory generator further comprises an output interface for controlling the control data of the drive system for carrying out a movement.

* * * * *